US006754612B1

(12) United States Patent
Vanfladern et al.

(10) Patent No.: US 6,754,612 B1
(45) Date of Patent: *Jun. 22, 2004

(54) PERFORMANCE MARKERS TO MEASURE BENCHMARK TIMING OF A PLURALITY OF STANDARD FEATURES IN AN APPLICATION PROGRAM

(75) Inventors: Kevin Vanfladern, Renton, WA (US); James P. Rodrigues, Redmond, WA (US); Suneetha Annangi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 248 days.

This patent is subject to a terminal disclaimer.

(21) Appl. No.: 09/606,896

(22) Filed: Jun. 29, 2000

(51) Int. Cl.$^7$ ................................................ G06F 11/30
(52) U.S. Cl. ..................................... 702/186; 717/129
(58) Field of Search ............................... 702/119, 123, 702/177–179, 182–183, 185–187; 717/124–135; 714/7

(56) References Cited

U.S. PATENT DOCUMENTS

| | | | | |
|---|---|---|---|---|
| 5,245,638 A | * | 9/1993 | Gustafson | 714/47 |
| 5,471,614 A | * | 11/1995 | Kakimoto | 709/102 |
| 5,953,689 A | * | 9/1999 | Hale et al. | 702/186 |
| 6,016,466 A | * | 1/2000 | Guinther et al. | 702/187 |
| 6,076,050 A | * | 6/2000 | Klein | 702/188 |
| 6,118,940 A | * | 9/2000 | Alexander, III et al. | 717/127 |
| 6,145,121 A | * | 11/2000 | Levy et al. | 717/135 |
| 6,189,022 B1 | * | 2/2001 | Binns | 709/100 |
| 6,189,142 B1 | * | 2/2001 | Johnston et al. | 717/125 |
| 6,233,531 B1 | * | 5/2001 | Klassen et al. | 702/80 |
| 6,247,170 B1 | * | 6/2001 | Giroux | 717/131 |
| 6,260,113 B1 | * | 7/2001 | Cherian et al. | 711/118 |
| 6,282,701 B1 | * | 8/2001 | Wygadny et al. | 717/125 |
| 6,349,406 B1 | * | 2/2002 | Levine et al. | 717/128 |

OTHER PUBLICATIONS

Gross, O., *Gamasutra*, "Pentium III Prefetch Optimizations Using the Vtune Performance Analyzer", vol. 3: Issue 28 (Jul. 30, 1999) (4 Parts—13 pages).
"Vtune™ Performance Enhancement Environment", Version 4.5, Product Overview, Intel, pp 1–10, (Feb. 2000).

* cited by examiner

*Primary Examiner*—Marc S. Hoff
*Assistant Examiner*—Mary Catherine Baran
(74) *Attorney, Agent, or Firm*—Merchant & Gould P.C.

(57) ABSTRACT

A method, apparatus, and article of manufacture provide a mechanism for inserting performance markers into programs to obtain and provide data regarding the run-time benchmark timing of the programs. The computing system has an init module for determining if the benchmark timing data is to be collected during the operation of the application program, a performance marker module for obtaining and storing the benchmark timing data for later retrieval, and an uninit module for formatting and storing the obtained benchmark timing data into memory that permits retrieval after the termination of the application program. The init module is executed before any benchmark timing data is collected. The performance marker module is executed each time benchmark timing data is to be collected. The uninit module is executed after all benchmark timing data desired has been collected. The method and computer data product relate to a computer implemented process that inserts one or more code markers into the application program at locations within the application program corresponding to the point at which benchmark timing data is desired and that determines if benchmark timing data is to be collected at each code marker by checking for the existence of processing modules identified by an identification key within a system registry.

31 Claims, 10 Drawing Sheets

Fig. 5A
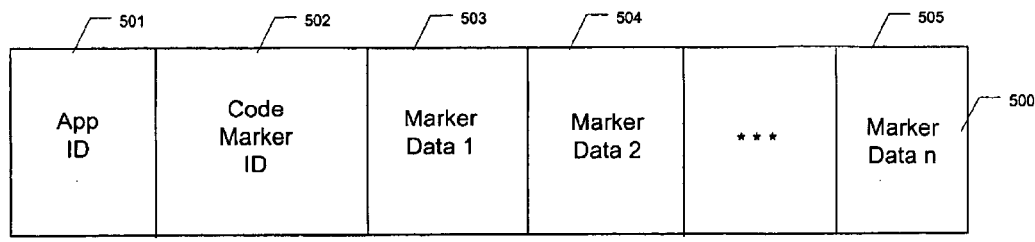
Fig. 5B
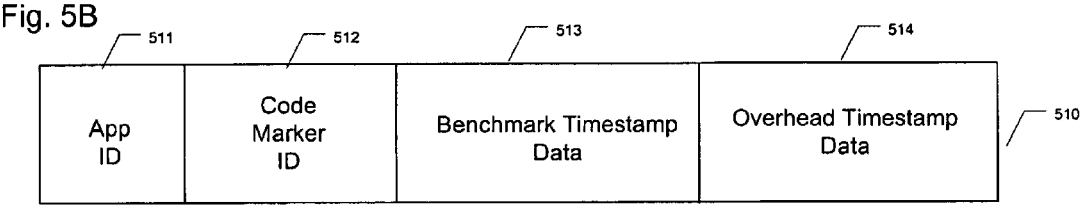
Fig. 5C
| 521 | 522 | 523 | 524 |
|---|---|---|---|
| 1 | 8 | 206994621185796 | 206994621186415 |
| 1 | 9 | 206994621186607 | 206994621186816 |
| 1 | 4 | 206994614902758 | 206994621187365 |
| 1 | 5 | 206994621186972 | 206994621187586 |
| 1 | 501 | 206994692692884 | 206994692694188 |
| 1 | 6 | 206995418775616 | 206995418776757 |
| 1 | 3 | 000000000000300 | 206995418832491 |
| 1 | 7 | 206995419948783 | 206995419948783 |
| 50 | 500 | 206994607250814 | 206994607250814 |
| 0 | 2 | 206995433571294 | 000000000000000 |
Fig. 5D
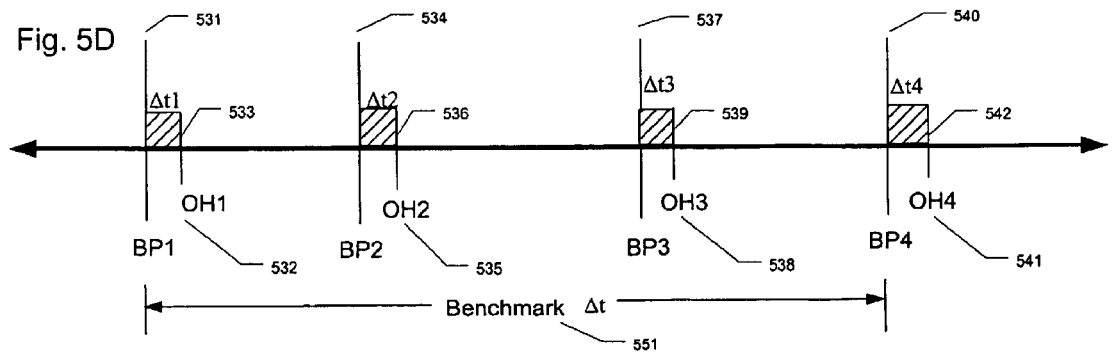

PERFORMANCE MARKERS TO MEASURE BENCHMARK TIMING OF A PLURALITY OF STANDARD FEATURES IN AN APPLICATION PROGRAM

RELATED APPLICATIONS

The instant application is related to two concurrently assigned and concurrently filed U.S: patent applications, PERFORMANCE MARKERS TO MEASURE PERFORMANCE OF FEATURES IN A PROGRAM, Ser. No. 09/606,961, filed Jun. 29, 2000 AND PERFORMANCE MARKERS TO MEASURE BENCHMARK TIMING OF FEATURES IN A PROGRAM, Ser. No. 09/606,925, filed Jun. 29, 2000.

TECHNICAL FIELD

This application relates in general to a method, apparatus, and article of manufacture for providing performance markers for testing of applications, and more particularly to a method, apparatus, and article of manufacture for inserting performance markers into programs to obtain and provide benchmark timing data regarding the run-time operation of a plurality of standard operations within the programs.

BACKGROUND OF THE INVENTION

One problem facing application program developers is how their application programs are to be tested. In order for the developers to test these programs, the developers need access to runtime state information regarding the internal operation of the program. This data can include memory usage, memory location contents, timing measurements for the execution of portions of the program, and similar data related to the state of the program while executing.

In the past, application developers have needed to use third party tools to re-instrument the target application (an example of this being post linker tools like Profilers which modify the application for the purpose of adding measurement code) with instructions that maintain and store the needed state data in locations that provide access by the developers. In doing this, the application developers are changing the application program being developed by artificially inserting this additional code. This insertion of code implies that the application developers are actually testing a program, which is different from the application program, which is ultimately delivered to end users. These differences caused by the insertion of this test code may or may not affect the ability of a programmer to adequately test the application program in an environment as close to the end user's working environment as possible. Additionally, the location of these insertion points is quite often limited to function call boundaries decreasing the granularity at which the timings can be taken. This limits the precision of the measurements.

This situation is especially acute to benchmark testing in which the developer wishes to measure the time the application program requires to perform a certain code block of functionality. In benchmarking, the insertion of extra instructions related to the collection of internal data causes the application program to perform additional instructions not included in the final application program version. These additional instructions would, in fact, be part of the instructions executed during benchmark testing of the program used for this testing. As a result, current benchmark testing is inherently inaccurate in that the tested program is not the actual program delivered to end users.

There is also a non-insertion method by which developers perform benchmarking. Currently, the non-insertion techniques used by developers who attempt to perform benchmark testing include a variety of methods that estimate when the program reaches the desired target points within the code. These external techniques include visually detecting a display of events that occur on the computers monitor. Often these methods also include attempting to synchronize the operation of the application program with a test control program also running on the computer. The control program performs the timing measurement and tries to externally determine via the visual cues, call backs, or events detectable via the message queue when to stop the timing. This technique has a low level of accuracy due to the control program essentially estimating when to start and/or stop the timings. It is limited to the granularity of measurement achievable via the visual cues as well as the inconsistent time occurring between the control program registering the start timing and the invocation of the user interface or programmatic interface action which begins the functionality to be timed. Additionally, the use of this external test control program also changes the testing environment for the application program in that a second process is concurrently running with the application program being tested. This second program or process is consuming computer resources such as processing time and memory. As a result, any results obtained using this method does not accurately represent the results, which occur in the final version of the application program run within a typical user's working environment. To avoid the overhead of the control program, the timings are sometimes performed by use of a stop watch but this adds an inconsistent and non-negligible overhead both in the starting and the stopping of the timings, and also relies on visual cues making it inherently inaccurate.

Application developers are in need of a mechanism to insert permanent target points to application programs in a manner which does not significantly increase the overhead requirements for the application program while still providing the developers with a mechanism to collect and report the internal operating state data for the application program at precise intervals. In addition, application developers need a mechanism by which this testing process may be easily enabled, disabled, and configured to perform a large variety of different tests.

SUMMARY OF THE INVENTION

In accordance with the present invention, the above and other problems are solved by providing a method, apparatus, and article of manufacture for inserting performance markers into programs to obtain and provide benchmark timing data regarding the run-time operation of a plurality of standard operations of the application programs.

One aspect of the present invention is a computing system having a mass storage device and a system timer for obtaining benchmark timing for a portion of an application program execution, the computing system has a mass storage system, an init module for determining if the timestamp data is to be collected during the operation of the application program, a performance marker module for obtaining and storing the timestamp data for later retrieval, an uninit module for formatting and storing the obtained timestamp data into a data file within the mass storage device that permits retrieval after the termination of the application program, and a performance benchmark data post processing module for determining the benchmark timing from two or more timestamp data entries. The performance marker module is executed at predefined points within a plurality of processing modules within the application program.

Another such aspect is a method for obtaining benchmark timing for a portion of an application program execution. The method inserts one or more code markers into the application program at predefined locations within the application program corresponding to the point at which benchmark timing data is desired and determines if benchmark timing data is to be collected at each code marker by checking for the existence of processing modules identified by an identification key within a system registry. If benchmark timing data is to be collected at each code marker, the method generates a benchmark data record containing the collected benchmark timing data each time the code markers are reached, stores the benchmark data records within a data memory block within the processing modules identified by the identification key within the system registry, and retrieving the benchmark data records from the data memory block for transfer to first data record in a Raw Data Table device once all of the run-time internal state data has been collected. Finally the method processes the first data records stored within the Raw Data Table to generate second data records in a Processed Data Table that estimate the benchmark timing defined between two benchmark data records.

Yet another aspect of the present invention is a computer data product readable by a computing system and encoding a computer program of instructions for executing a computer process for obtaining run-time internal state data within an application program. The computer process inserts one or more code markers into the application program at predefined locations within the application program corresponding to the point at which benchmark timing data is desired. The computer process determines if benchmark timing data is to be collected at each code marker by checking for a processing modules identified by an identification key within a system registry. If benchmark timing data is to be collected at each code marker, the computer process generates a benchmark data record containing the collected benchmark timing data each time the code markers are reached, stores the benchmark data records within a data memory block within the processing modules identified by the identification key within the system registry, retrieves the benchmark data records from the data memory block for transfer to first data record in a Raw Data Table device once all of the run-time internal state data has been collected, and processes the first data records stored within the Raw Data Table to generate second data records in a Processed Data Table that estimate the benchmark timing defined between two benchmark data records. The benchmark timing generated and stored within the processed data table is determined from difference between two data entries stored within the raw data table.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

The great utility of the invention is that it provides application program developers with a mechanism for inserting performance markers into programs to obtain and provide data regarding the run-time operation of the programs. These and various other features as well as advantages, which characterize the present invention, will be apparent from a reading of the following detailed description and a review of the associated drawings.

BRIEF DESCRIPTION OF THE DRAWINGS

Referring now to the drawings in which like reference numbers represent corresponding parts throughout:

FIG. 5A illustrates a sample performance data record according to an embodiment of the present invention.

FIG. 5B illustrates a sample performance benchmark data record according to another embodiment of the present invention.

FIG. 5C illustrates a sample performance benchmark data file according to an embodiment of the present invention.

FIG. 5D illustrates a timing sequence for code marker benchmark timing according to an embodiment of the present invention.

DETAILED DESCRIPTION OF THE INVENTION

This is an application to a method, apparatus, and article of manufacture for inserting performance markers, also generically referred to as code markers, into programs to obtain and provide benchmark timing data regarding the run-time operation of the programs.

Figure 1:
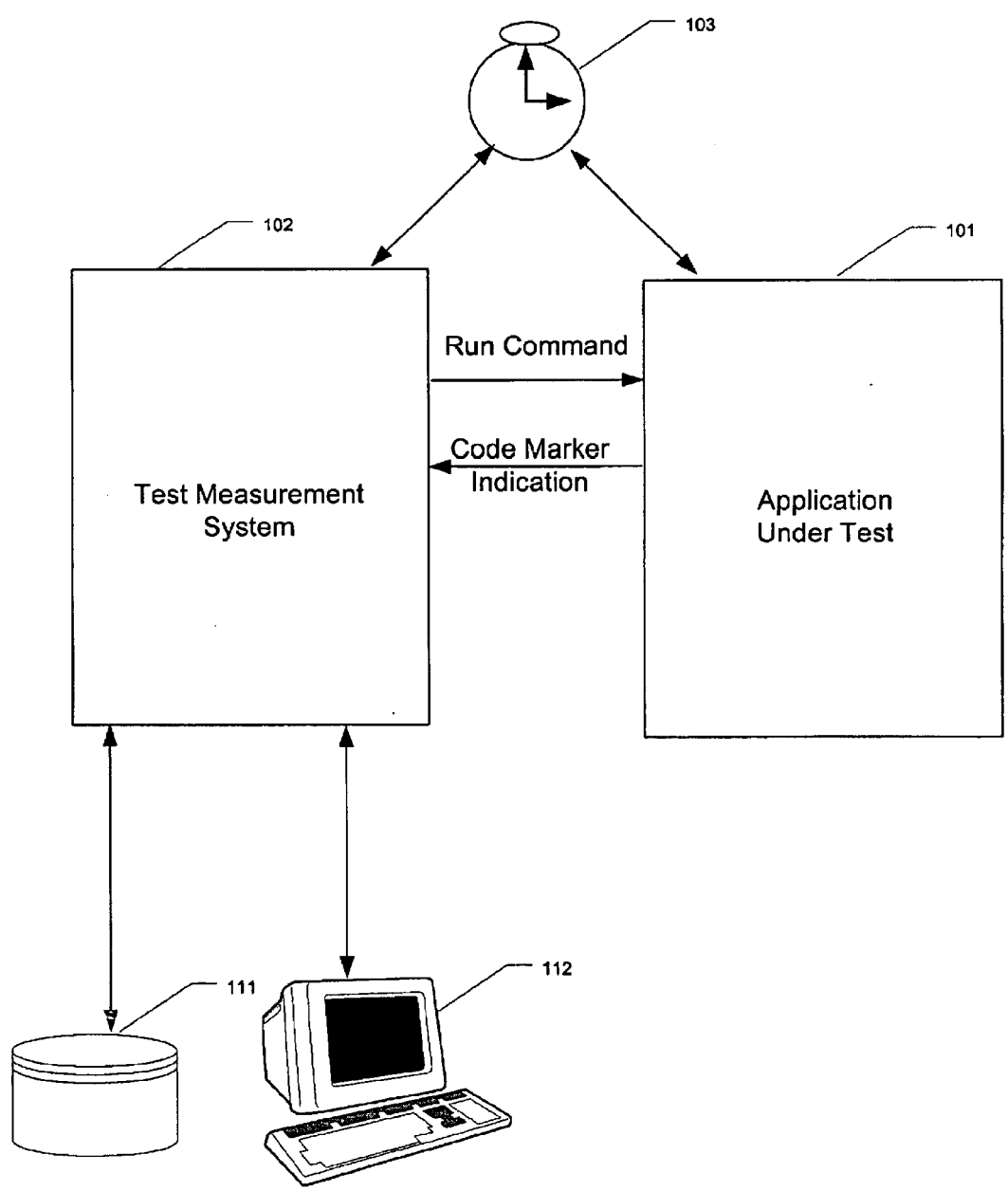
FIG. 1 illustrates an application program testing system according to one embodiment of the present invention.

FIG. 1 illustrates an application program testing system according to one embodiment of the present invention. Typically, when an application program 101 is being tested, the application program 101 interacts with a test measurement system 102 in order to control the operation of the application program 101 during the test. The test measurement system 102 transmits a run command 121 to the application program being tested 101 to instruct the program 101 to begin its operations. A user typically has inserted one or more code markers within the application program 101 to indicate the points during the operation of the application program 101 in which runtime data is desired. When the operation of the application program 101 reaches a code marker, a code marker indication 122 is transmitted to the test measurement system 102.

The test measurement system 102 uses the receipt of a code marker indication 122 as an indication that the application program 101 has reached one of the previously defined these code markers. At this point in time, the test measurement system 102 may obtain runtime data from the application program 101 for storage within a mass storage device 111 or display upon a user's terminal 112. The test measurement system 102 will provide the application program 101 a second run command 121 to indicate to the application program that it should resume its operation until another code marker is reached. If the test measurement system 102 wishes to obtain timing information regarding how long a particular operation within the application program 101 takes to perform, the test measurement system 102 may obtain a time stamp for a first code marker from a timing device 103. If time stamps are obtained by the test measurement system 102 at the beginning and end of a desired operation, the test measurement system 102 may determine how long it took for an application program 101 to perform the operation simply by comparing the difference between the two times.

Other performance measurements may be obtained in a similar manner to the timing measurements discussed above by obtaining run-time state data, such as the amount of memory being used, all file transactions that occur including read operations, write operations, and delete operations that are performed on a given file, and similar useful system test data at the various code markers. Comparing the states of the program 101 at the code markers allows a user to determine what processes occurred between any two user defined code markers set within the program 101.

Figure 2:
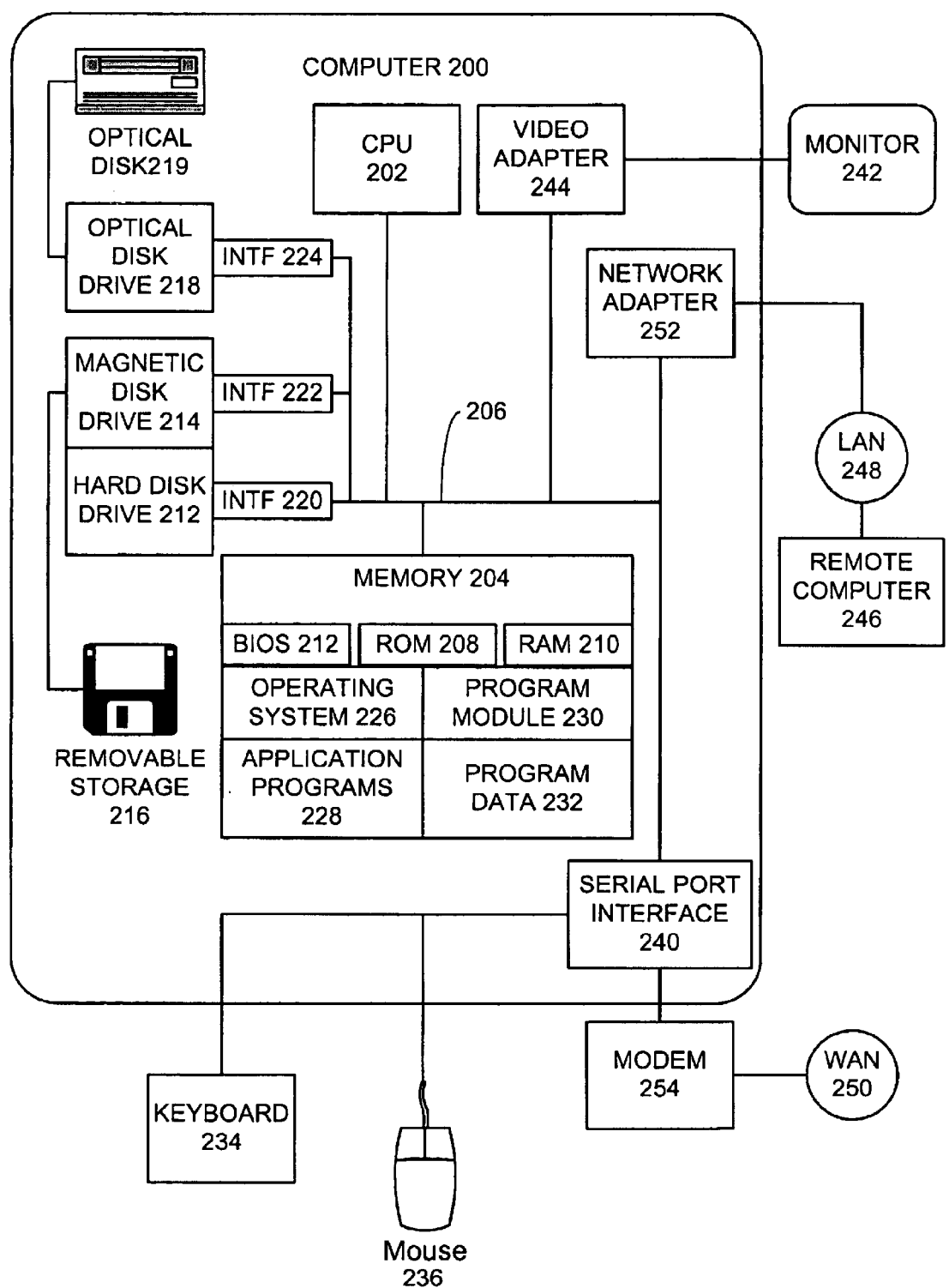
FIG. 2 illustrates a general purpose computing system for use in implementing as one or more computing embodiments of the present invention.

With reference to FIG. 2, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 3:
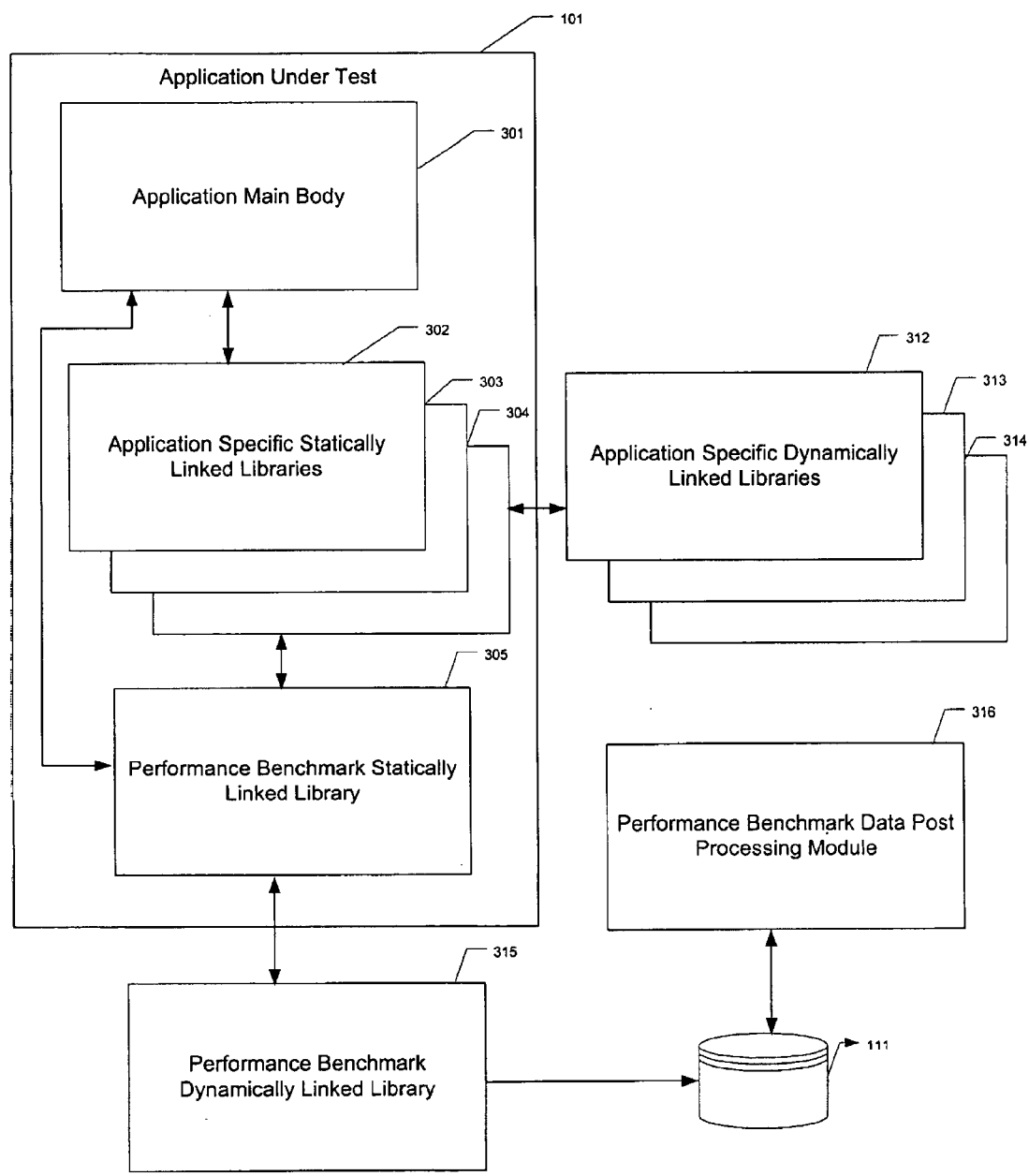
FIG. 3 illustrates another application program testing system according to another embodiment of the present invention.

FIG. 3 illustrates another application program testing system according to another embodiment of the present invention. An application program 101 being tested consists of an application main body module 301, one or more application specifically defined linked libraries 302–304, one more application specifically defined dynamically linked libraries 312–314, a performance benchmark statically linked library 305, and a performance benchmark dynamically linked library 315. In the past, application programs typically consisted of all the above modules with the exception of the performance benchmark statically linked library 305 and the performance benchmark dynamically linked library 315. An application developer who writes the application program 101 has specified a collection of processing modules, which may not be organized into the various libraries. These modules are combined together to create the application program 101 that the application developer wishes to test.

The application developer tests the operation of the application program 101 by inserting within any of the application specific modules 301–304 and 312–314 one or more benchmark code markers. These code markers comprise function calls to modules within the performance benchmark statically linked library 305. The functionality, which is to be performed at a particular benchmark code markers, is implemented within these function calls. This functionality may be located within either the performance benchmark statically linked library 305 or the performance benchmark dynamically linked library 315.

The runtime data that the application developer wishes to obtain at each of these code markers is stored within the mass storage device 111 and may be examined and further processed within a performance benchmark data post processing module 316. In order to minimize the runtime overhead associated with the implementation of the processing for a given code marker, the data collected at a particular code marker is stored within memory of the performance benchmark dynamically linked library 315 and ultimately transferred to the mass storage device 111. Processing of the data collected and displaying the data to an application developer performing a test, is performed by the performance benchmark data post processing modules 316. By performing the code marker data analysis processing end data display functions within a data post processing module 316, the amount of processing performed at runtime to implement a code marker is minimized.

Figure 4:
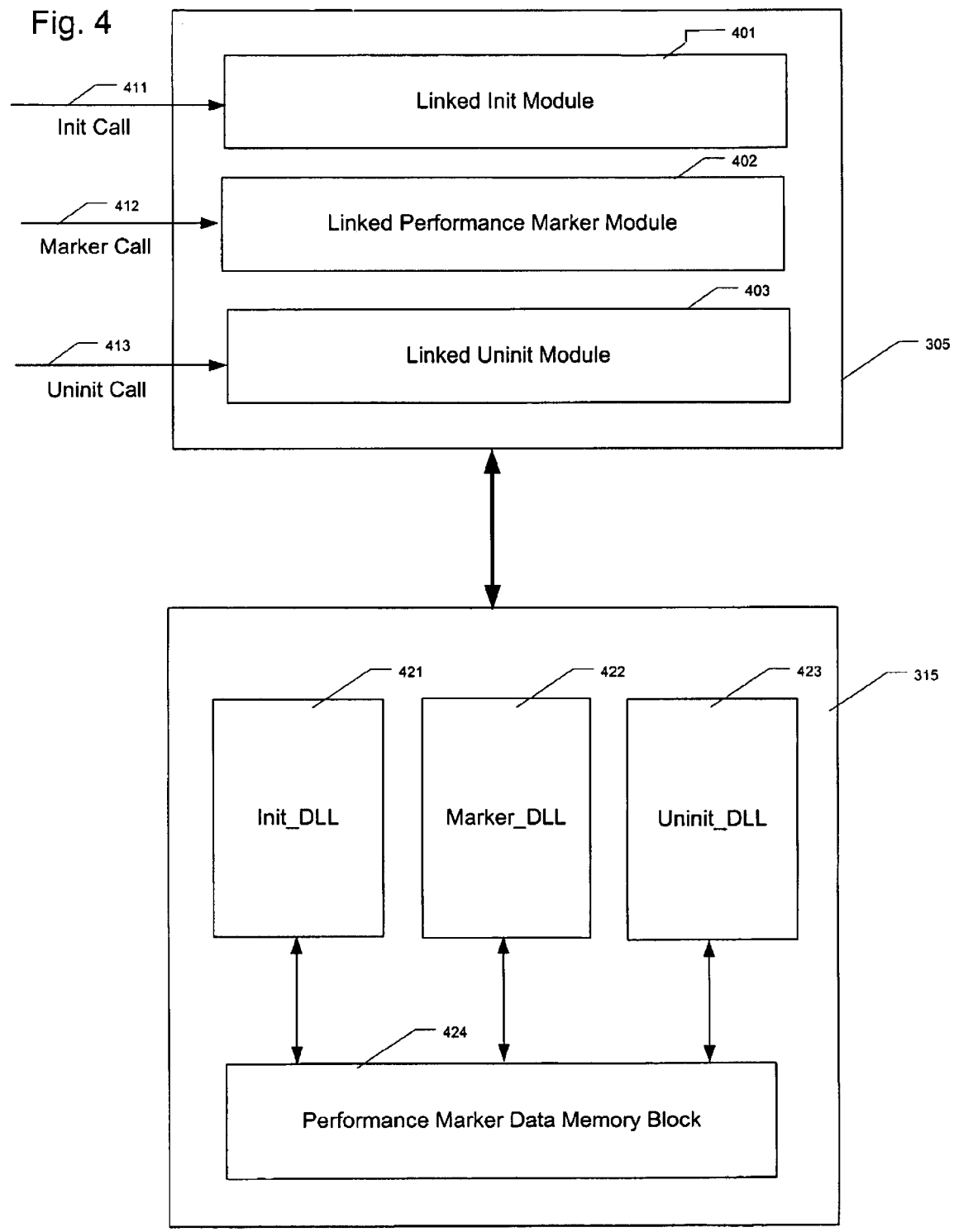
FIG. 4 illustrates a performance benchmark statically linked library and a performance benchmark dynamically linked library for use in program testing according to an example embodiment of the present invention.

FIG. 4 illustrates a performance benchmark statically linked library and a performance benchmark dynamically linked library for use in program testing according to an example embodiment of the present invention. The performance benchmark statically linked library 305 and the performance benchmark dynamically linked library 315 implement the functionality needed to insert benchmark data collection within an application program 101. The performance benchmark statically linked library 305 comprises three modules: a linked Init module 401, a linked performance marker module 402, and a linked uninit module 403. The linked Init module 401 is accessed using an Init call 411 that is called once at the beginning of the application program 101 that is being tested. The performance marker module 402 is accessed using a marker call 412 which is called each time a benchmark code marker inserted within the application program 101 is reached. Finally, the Linked unInit module 403 is accessed using an uninit call 413. The uninit call 413 is called once at the end of the execution of the application program 101 to complete the data collection process.

The processing performed to implement the code markers requires the data collection processing modules that hold the runtime state data be initialized before any of the code markers are reached. This initialization process occurs within the linked init module 401. Once the data collection processing modules have been initialized, any number of code markers may be called using the marker call 412 to the linked performance marker module 402. Each code marker will cause a corresponding call to linked performance marker module 402, which in turn captures and stores the benchmark runtime data into the data collection processing modules. In addition, each code marker generates and stores a benchmark data record into a computer systems memory containing the captured data.

When the processing has been completed, a single uninit call 413 is made to the linked unInit module 40 to retrieve all of the benchmark data records from memory for storage onto the mass storage device 111 and/or display to an application developer on his or her terminal 112. The benchmark data records are stored within a file system on a mass storage device 111 in order to allow the records to be accessed and analyzed using a performance benchmark data post processing module 316.

Within each of the three processing modules within the performance benchmark statically linked library 305, the processing simply includes a function call to corresponding dynamically linked libraries (DLL) within the performance benchmark dynamically linked libraries 315. With such an arrangement, a single performance benchmark statically linked library 305 may be statically linked within an application program 101, and may be small in size, while permitting the particular functionality to be performed within a benchmark test to be defined within the dynamically linked libraries. As such, a single mechanism may be used within an application program 101 that easily allows a plurality of different tests to be performed simply by changing the identity of the performance benchmark dynamically linked library 315 that are used as part a single test.

The linked Init module 401, when called at the beginning of application program 101, obtains the identity of the dynamically link library to be used for a particular test. This identity of the dynamically linked libraries is typically stored within a registry key in the system registry of the computing system. If the registry key which identifies the dynamically linked library is not found within the registry, the linked init module 401 determines that any benchmark code markers encountered are not to perform any processing. Therefore, a application program 101 may be shipped to an end user without the performance benchmark dynamically linked libraries 315, and the corresponding system registry entries, where any benchmark code markers inserted within the application program 101, will not result in the performance of any additional processing.

Within the linked init module 401, the processing also determines whether the dynamically link library 315, which has been identified by a system registry key, actually exists on the computing system. If this dynamically link library does not exist even though a registry key exists, or if the dynamically link library corresponding to the registry key does not contain the expected functions, the Init module 401 also determines that the code marker processing is not to occur.

The linked performance marker module 402, which is called each time a code marker is reached, simply checks to see if the linked Init module 401 determined that benchmark code marker processing is to occur. If this code marker processing is not to occur, the link performance module 402 merely returns to the calling application program 101. If the init module 401 had determined that benchmark code marker processing is to occur, the linked performance marker module 401 calls the marker DLL module 422 to collect the required runtime state data and to store this runtime state data within a performance marker data memory block 424. The marker DLL module 422 generates a benchmark data record for each corresponding code marker called to the marker DLL 422. These benchmark data records are simply stored as a concatenated array of records within the memory block 424.

Once all the processing has been completed, the uninit module 403 is called using unInit call 413. This module 403 also checks to determine if the Init module 401 has indicated that benchmark processing is to occur. If this benchmark processing is not to occur, the linked unInit module 403 simply returns to the application program 101. If the benchmark processing is to occur, the linked uninit module 403 calls the corresponding uninit DLL module 423. The unInit DLL 423 module retrieves all of the benchmark data records from the memory block 424, formats them appropriately, and stores these records within the mass storage device 111. Once these records reach the mass storage device 111, further analysis, review, and subsequent processing may be performed by the application developer as needed.

Because the particular benchmark code marker process that is to occur during a given test is implemented with in the three DLL modules 421–423, the performance benchmarks, according to the present invention are readily extensible in that a single yet simple interface to a data collection mechanism may be specified in which the particular nature of the test performed does not need a to be embedded in the application program 101. In fact, this processing is contained completely within the set of three DLL modules 421–423. Additionally, the overhead associated with the embedding the calls to the performance benchmark modules within an application program may be minimize. This fact is further emphasized by including all of the state difference processing needed to determine how long a block of code requires for execution, and to determine which state variables have changed during the execution of a given segment of code, within post processing operations performed upon the set of benchmark data records.

FIG. 5A illustrates a sample performance data record according to an embodiment of the present invention. Each code marker with data record 500 comprises a plurality of data fields used to represent the current state of an application program 101 at the time a code marker is reached. The record 500 includes an application identifier 501 that is used to identify uniquely the application program 101 from which the data record was generated. The record 500 includes a code marker Identifier 502 which is used to identify the particular code marker that generated this data record 500. Finally, the data record 500 includes one or more marker data fields 503–505 that records the current state data for the application program 101 at the time that the code marker was reached.

The above data record 500 may contain timing data such as a time stamp of the time at which the code marker was reached. The data record 500 may also contain an additional time stamp for the time in which the code marker processing returns from the DLL function 422 as a means to determine approximation for the overhead associated with the processing of the code marker data collection and storage operations. Other fields may include additional identifiers relating to the data being processed, a version of the application program being tested, and similar tests specific data that may be needed to analyze the performance data after the test is completed.

FIG. 5B illustrates a sample performance benchmark data record according to an embodiment of the present invention. Each benchmark data record 510 comprises a plurality of data fields in used to represent the current state to of an application program 101 at the time a code marker is reached. The record 510 includes an application identifier 511 that is used to identify uniquely the application program 101 from which the data record was generated. The record 510 includes a code marker Identifier 512 which is used to identify the particular code marker that generated this data record 501. Finally, the data record 501 includes two timestamp data fields, a Benchmark Timestamp data 513 and an Overhead Timestamp data 514.

The Benchmark Timestamp data 513 is obtained immediately after the code marker has been reached. As discussed above in FIG. 4, the code marker will generate a function call to the Linked Performance Marker module 402 within the Performance Marker Link Library module 305. This time stamp is obtained within the Linked Performance Marker module 402 immediately after it is determined that the performance marker processing is to occur. The timestamp is obtained as soon as possible to attempt to minimize the latency between the application program's arrival at the code marker within its code and the execution of the instructions that actually obtain the timestamp measurement.

Once this time stamp data has been obtained, a call is made to the Marker_DLL module 422 to complete the performance marker processing. Once this processing has been completed, a second timestamp is obtained. This second timestamp, an Overhead Timestamp data 514, represents the best approximation for the time at which the processing returned from the performance marker processing performed within the Linked Performance Marker module 402 and the Marker_DLL module 422. The second timestamp completes the benchmark data record 501 that is stored within the performance marker data memory block 424.

FIG. 5C illustrates a sample data file 520 for a benchmark process that determines the time required to perform various operations within application program 101. Each data record comprises four fields: an AppID 521, a code marker ID 522, a time stamp for a code marker timestamp 523, and a time stamp for an overhead timestamp 524. The time stamps in this illustrated embodiment may be obtained from a system timer/counter found within computing systems. This system timer is related to the operating clocks used within a computing system and thus relates directly to the time, measuring clock cycles, required to reach a particular point in the execution of the program. As such, the difference between various time stamps, after subtracting any overhead time, would represent the amount of time, as measured in clocks cycles, needed to perform the processing between any two code markers. The overhead time estimate is determined by calculating the difference between the Benchmark Timestamp data 513 and the Overhead Timestamp data 514.

FIG. 5D illustrates a timing sequence for code marker benchmark timing according to an embodiment of the present invention. The timing diagram illustrates a sequence of four code markers BP1 531, BP2 534, BP3 537, and BP4 540. Each of these code markers corresponds to a point in time at which the application program 101 reached each of four code markers placed within its code. As discussed above, each of these four code markers also obtains four additional timestamps, OH1 532, OH2 535, OH3 538, and OH4 541 that measure an estimate for the time at which the processing returned from the performance marker libraries 305, 315 to the application program 101.

In FIG. 5D, a benchmark $\Delta t$ 551 represents the time required for the application program 101 to complete the processing that occurs between BP1 531 and BP4 540. Because the processing time for this task also includes processing associated with obtaining and storage of the various code markers, the estimate for the overhead processing, in this example Δt1 533, Δt2 536, and Δt3 538, must be subtracted from the difference between BP1 531 and BP4 540. Each of the overhead processing estimates is determined from the difference between the benchmark time stamp and the overhead timestamp. For example, $$\Delta t2\ 536 = OH2\ 535 - BP2\ 534. \quad (1)$$

The same determination may be made for each of the other time stamps obtained during a test. In addition, the timestamp is measured in units of clock cycle counts in the preferred embodiment. As such, all time measurements discussed herein need to be scaled by the time for a single clock cycle if measurements in seconds is desired.

Given the above explanation, the measurement of an accurate benchmark is obtained by calculating the difference between two time stamps, BP4 540 and BP1 531, for example. The accurate benchmark is calculated by subtracting an estimate of all of the time spent within performance marker libraries 305, 314, from the above difference. In the example in FIG. 5C, the accurate benchmark is $$\text{Benchmark}\ (BP4\ 540 - BP1\ 531) - (\Delta t1\ 533 + \Delta t2\ 536 + \Delta t3\ 539). \quad (2)$$

All of this processing to determine the benchmark timing is performed as part of the Performance Benchmark Data Post Processing module 316 that is run after the application program 101 has completed its operations.

Figure 6:
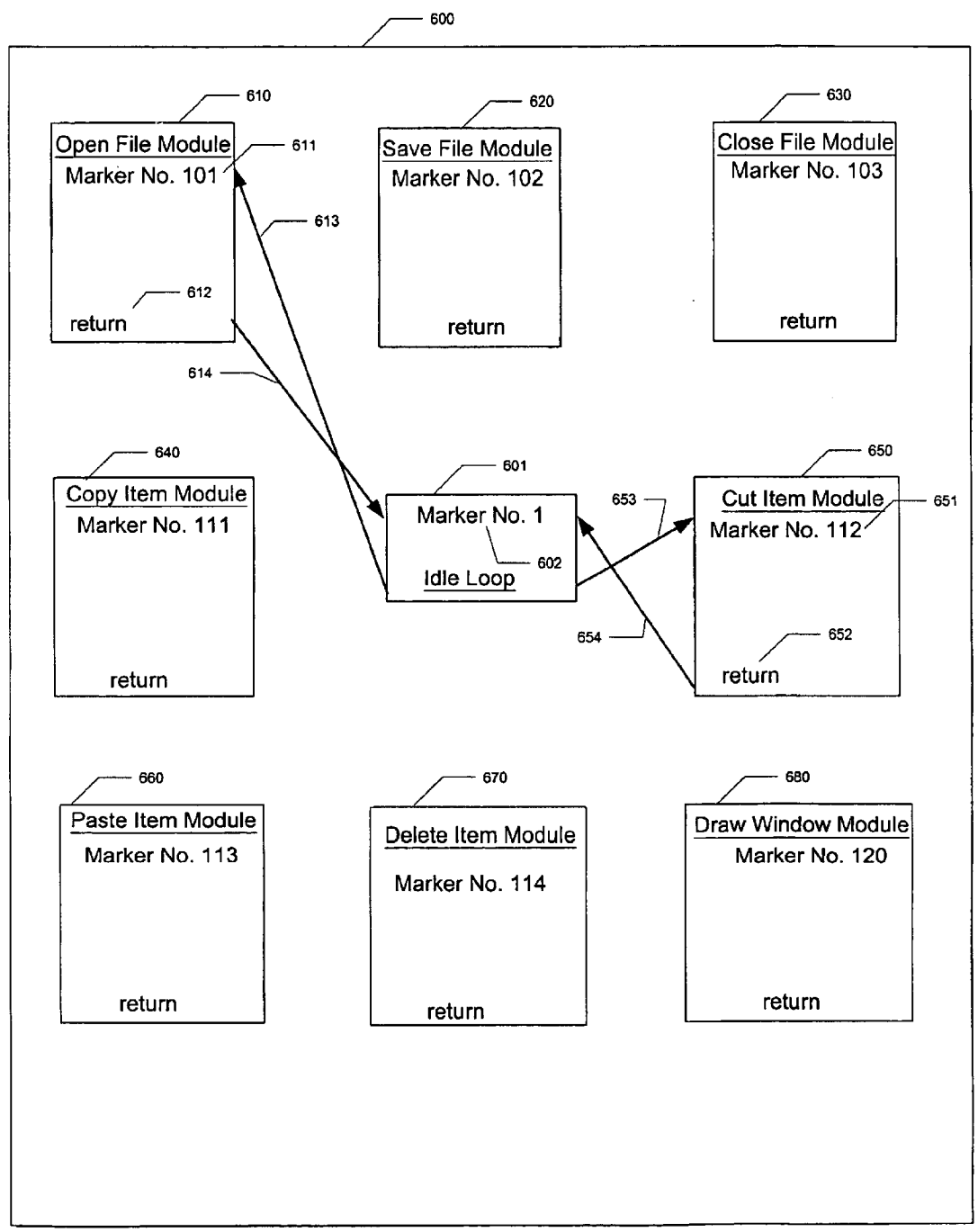
FIG. 6 illustrates an interaction of a number of processing modules within an application program having inserted performance markers according to an embodiment of the present invention.

FIG. 6 illustrates an interaction of a number of processing modules within an application program having inserted performance markers according to an embodiment of the present invention. Most application programs 600 are constructed using a plurality of processing modules that each implements a particular function for a user. In addition, application programs 600 typically provide a standard set of operations such as open file, save file, close file, cut, copy, paste, delete, and draw a window and its contents. When application programs are tested and benchmarks are provided, these benchmark results typically wish to measure the benchmark times for these standard operations that are present in most, if not all application programs 600.

Because these functions are typically implemented as a set of independent processing modules, the insertion of performance markers into these modules will allow for the collection of the timing data needed to obtain the benchmark timing data. Consider the example in FIG. 6 in which an application program 600 possesses these standard modules. These modules include an Open File module 610, a Save File module 620, a Close File module 630, a Copy Item module 640, a Cut Item module 650, a Paste Item module 660, a Delete Item module 670, and a Draw Window module 680. The application program 600 also includes an Idle Loop module 601 in which the application program stays while awaiting a command to perform an operation input by a user.

Given this structure for the application program 600, the benchmark timing for a particular function is determined by measuring the time from the instruction that branches from the Idle Loop module 601 to the particular function until the time for the instruction where the program returns to the Idle Loop module 601. Two such examples are shown in FIG. 6. First, an open file operation uses the Open File module 610. The benchmark timing is determined by measuring the time from the branch 613 to the Open File module 610 until the return operation 612 and branch 614 back to the Idle Loop module 601. These two time stamps may be obtained by inserting a Marker No. 101 611 at the beginning of the Open File module 610 and by inserting Marker No. 1 602 at the beginning of the Idle Loop module 601. Therefore, the benchmark timing for an open file operation is determined calculating the difference in the time stamps between Marker No. 1 602 and Marker No. 101 611.

Similarly, a cut item operation uses the Cut Item module 650. The benchmark timing is determined by measuring the time from the branch 653 to the Cut Item module 650 until the return operation 652 and branch 654 back to the Idle Loop module 601. These two time stamps may be obtained by inserting a Marker No. 112 651 at the beginning of the Cut Item module 650 and by inserting Marker No. 1 602 at the beginning of the Idle Loop module 601. Therefore, the benchmark timing for an open file operation is determined calculating the difference in the time stamps between Marker No. 1 602 and Marker No. 112 651.

Because the Idle Loop module 601 executes the Marker No. 1 602 each time it passes through the idle loop, and because the above benchmark measurements both use Marker No. 1 602 to end a measurement, the benchmark measurement uses the first occurrence of a Marker No. 1 602 value following the start marker, i.e. Marker No. 101 611. This process of using the first occurrence of an Idle Loop module 601 module marker 602 to end a benchmark test by mapping this marker to an end test marker data value is referred to as a Morph Marker. The post processing module 315 performs all of the data processing necessary to remap and correctly use the appropriate timestamp measurements. In addition, the results of the benchmark tests are all that is affected from this Morph Marker process as the time stamp data file, as shown in FIG. 5C, is simply a set of time stamp values corresponding to when a marker was executed. The benchmark values are calculated and determined from the post processing of the time stamp data in the post processing module 315.

All of the processing modules within the application program 600 have an individual marker inserted at its beginning in order to permit comprehensive benchmark testing of the application program 600 to occur. Because these markers do not require a significant amount of processing when benchmark testing does not occur, developers may insert these markers into the modules and leave them in the shipping product without suffering a significant performance penalty. At the same time, the developers will possess a powerful mechanism to test and benchmark the application program accurately.

Finally, the post processing module 315 may also support additional functions to aid in the performance of testing of the application program. First, the post processing module 315 may support a Replace Marker module that remaps a Marker ID to a Second Marker ID as part of a particular test. For example, an open File operation may be tested using both a large and a small data file. As such, both benchmark tests will use Marker No. 101 611 to begin the test and Marker No. 1 602 to end the test as discussed above. However, the developer knows that the tests are different because of the input file being opened.

Therefore, the post processing module 315 may remap/replace the marker ID 101 612 generated by the DLL modules with a unique ID for the two tests being performed. Thus a test report generated by the post processing module 315 reports that the small file open occurs on Marker No. 501 and the large file open occurs on Marker No. 601 rather than both beginning on Marker No. 101 611.

The system provides a code marker status function that allows the developer to turn the performance marker function on and off externally during the testing. This function may be accomplished by modifying the Flag used to determine if performance markers are to be used. If this flag is maintained within the system registry, an external process may change the status of the flag. As a result, a developer can control exactly when a set of markers are used to collect data within the DLLs without having to collect data for a large sequence of operations that also contain performance markers when only a small set of markers are of interest. In such a case, the developer performs a set of operations to place the application program into a desired state with the status set to OFF. Once in a desired state, the status is set to ON and a test is collected where data from the markers is collected. Then the status may be turned OFF as desired.

Figure 7:
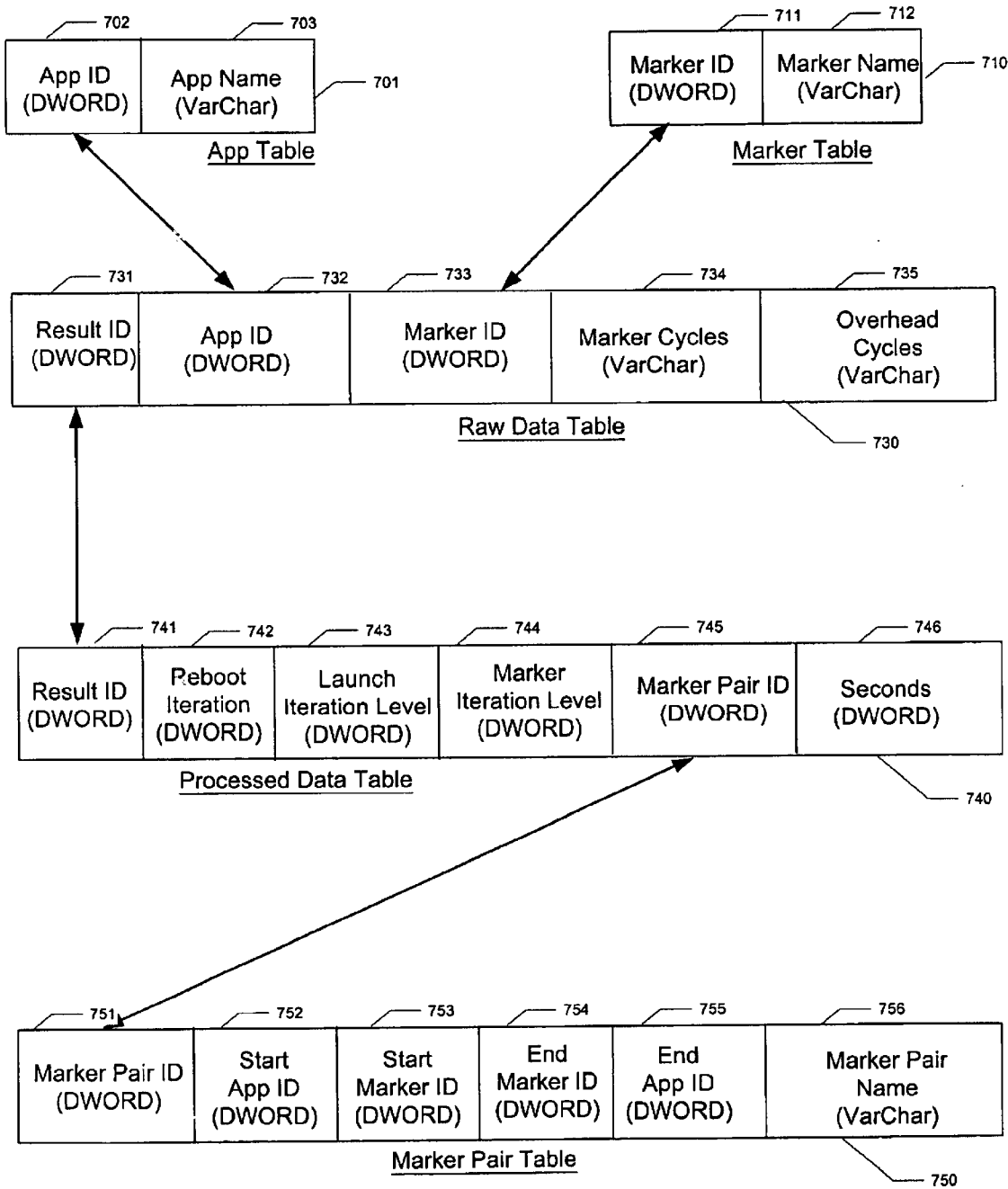
FIG. 7 a plurality of database tables having interrelated fields used to implement an application program benchmark testing system according to another embodiment of the present invention.

FIG. 7 a plurality of database tables having interrelated fields used to implement an application program benchmark testing system according to another embodiment of the present invention. The post processing module 315 uses a series of database tables to maintain all of the test data that has been collected and processed. These tables include an App Table 701, a Marker Table 710, a Raw Data Table 730, a Processed Data Table 740, and a Marker Pair Table 750. The App Table 701 has two fields, AppID 702 and App Name 703, and provides a list of AppID to Application Program name relationships for the system. Each application will be given a unique AppID. Similarly, the Marker Table 710 has two fields, MarkerID 711 and Marker Name 712. Marker Table 710 defines the relationship between a Marker ID number and its corresponding name. For example, all open file modules in every application use Marker ID number 101 to correspond to the example listed above.

The Raw Data Table 730 has five fields: a ResultID 731, the AppID 732, the MarkerID 733, a Marker Cycles 734, and an Overhead Cycles 735. This record corresponds to the time stamp data record discussed above in FIG. 5B. The AppID 732 matches the AppID 702 from the AppTable 701 to define the application program name that generated the data. Similarly, the MarkerID 733 matches the Marker ID 711 from the MarkerTable 710 to define the marker name that generated the data.

The post processing module 315 generates the records within the Processed Data Table 740 using the records from the Raw Data Table 730. The Processed Data Table 740 has six fields: ResultID 741, Reboot Iteration 742, Launch Iteration 743, Marker Iteration Level 744, Marker PairID 745, and Seconds 746. The ResultID 741 corresponds to the ResultID 731 from which the raw data is obtained. The iteration values 742–744 define the time at which test was performed in terms of the ID of when the computer was rebooted, of when the application was launched, and when the operation generating the markers was performed. The Marker PairID 745 is used to uniquely identify the pair of markers used in the particular benchmark calculations with a unique ID number. This Marker PairID 745 corresponds to a matching Marker PairID field 751 within the Marker Pair Table 750 used to define the pair of markers defining a benchmark measurement. The Seconds field 746 is an expression for the benchmark test in seconds. Since the time stamps are measured in terms of clock cycles counted by a system counter, the time in seconds is determined by multiplying the number of cycles for the measurement by the time period for a clock cycle (i.e. 1/clock frequency for the computer).

The Marker Pair Table 750 has six fields: a Marker PairID 751 as discussed above, a StartAppID 752, a StartMarkerID 753, an End MarkerID 754, an End AppID 755, and a Marker Name 756. The StartAppID 752 and the End AppID 755 define the IDs of the applications, as defined in the App Table 701, in which the start and ending markers are found for a given marker pair. The StartMarkerID) 753 and the End MarkerID 754 define the IDs of the Markers, as defined in the App Table 710, used to define the marker pair. Finally, the MarkerName 756 provides a name for this test pair.

Figure 8:
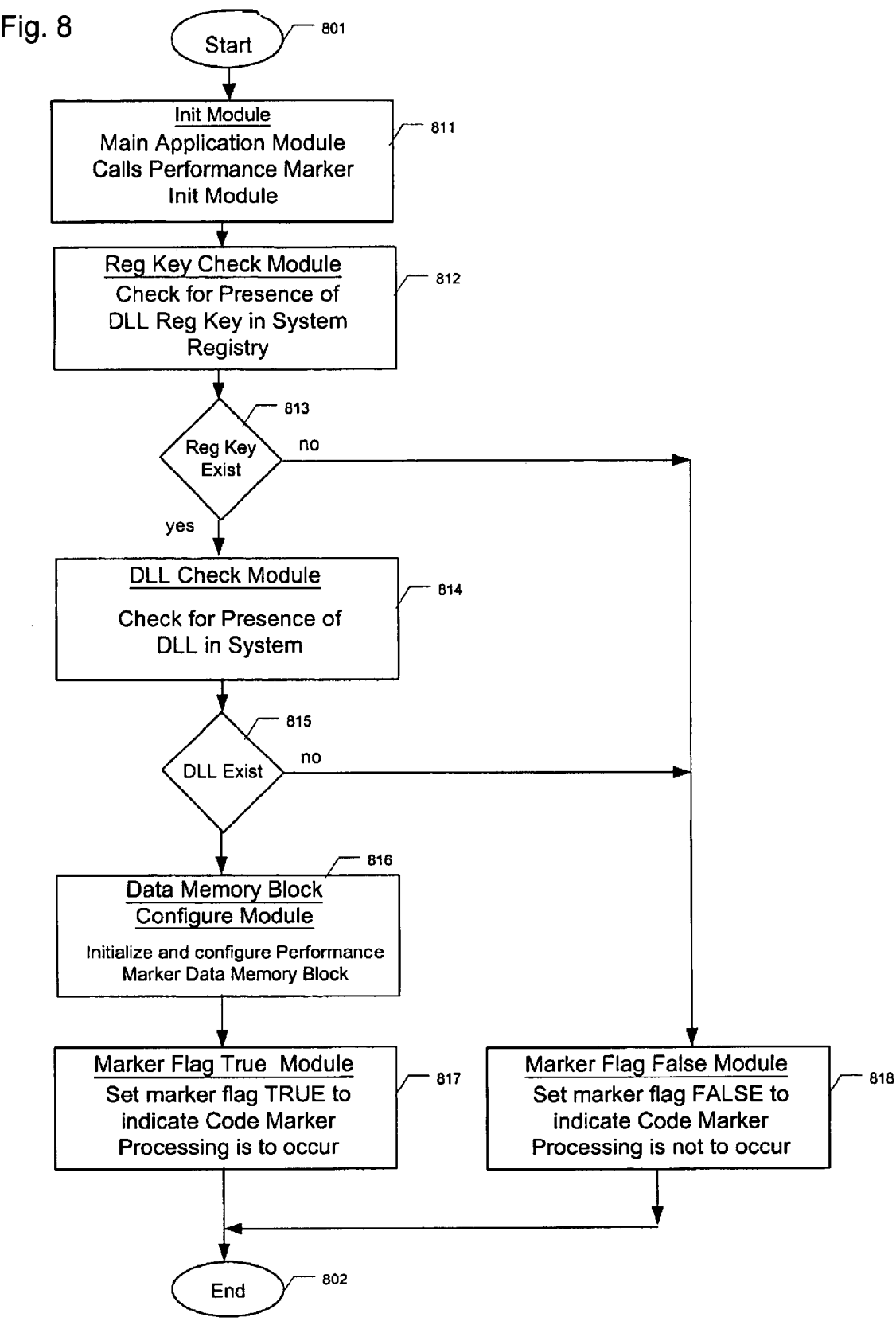
FIG. 8 illustrates an operational flow for an initialization module within a performance markers module according to an embodiment of the present invention.

FIG. 8 illustrates an operational flow for an initialization module within a performance markers module according to an embodiment of the present invention. The processing within the initialization process 801 proceeds to an Init module 811. Within the Init module 811, the main application module calls the performance marker init module 401 in order to initialized the data memory block 424 used to hold a collection of benchmark data records. Once complete, the processing proceeds to the Reg Key Check module 812. This module 812 checks a DLL registry key within a system registry on the computer. This registry key provides the identity to a dynamically linked library containing the processing modules needed to implement the code marker processing.

Test module 813 determines whether this registry key exists. If not, processing branches to a Marker Flag False module 818. If a registry key does exist, as determined by test module 813, processing proceeds to DLL check module 814. This module 814 checks for the presence of the DLL modules within the system as identified in by the previously checked registry key. This module 815 determines the outcome of the previous check for the existence of the DLL module. If the DLL module does not exist, processing again branches to Marker Flag False module 818.

If the DLL module identified by the registry key exists, processing branches to Data Memory Configuration module 816. This configuration module 816 initializes and configures a performance marker data memory block 424 within the DLL. This memory block to is used to hold the collection of the benchmark data records generated by the performance benchmarking process. Once complete, a Flag Marker True module 817 sets a marker flag to be true. This flag is used by other processing the to indicate whether not a performance benchmark processing is to occur. Once this processing has completed, the processing ends 802.

Returning to either test operation 812, or 815, if either of these tests are determined to be false, the processing proceeds to Marker Flag False module 818. This flag module 818 sets the marker flag to be false, thus indicating to the processing that performance benchmark processing is not to occur because either the DLL doesn't exist or the registry key that identifies the DLL to be used does not exist. Once this flag is been set, the processing also ends 802.

Figure 9:
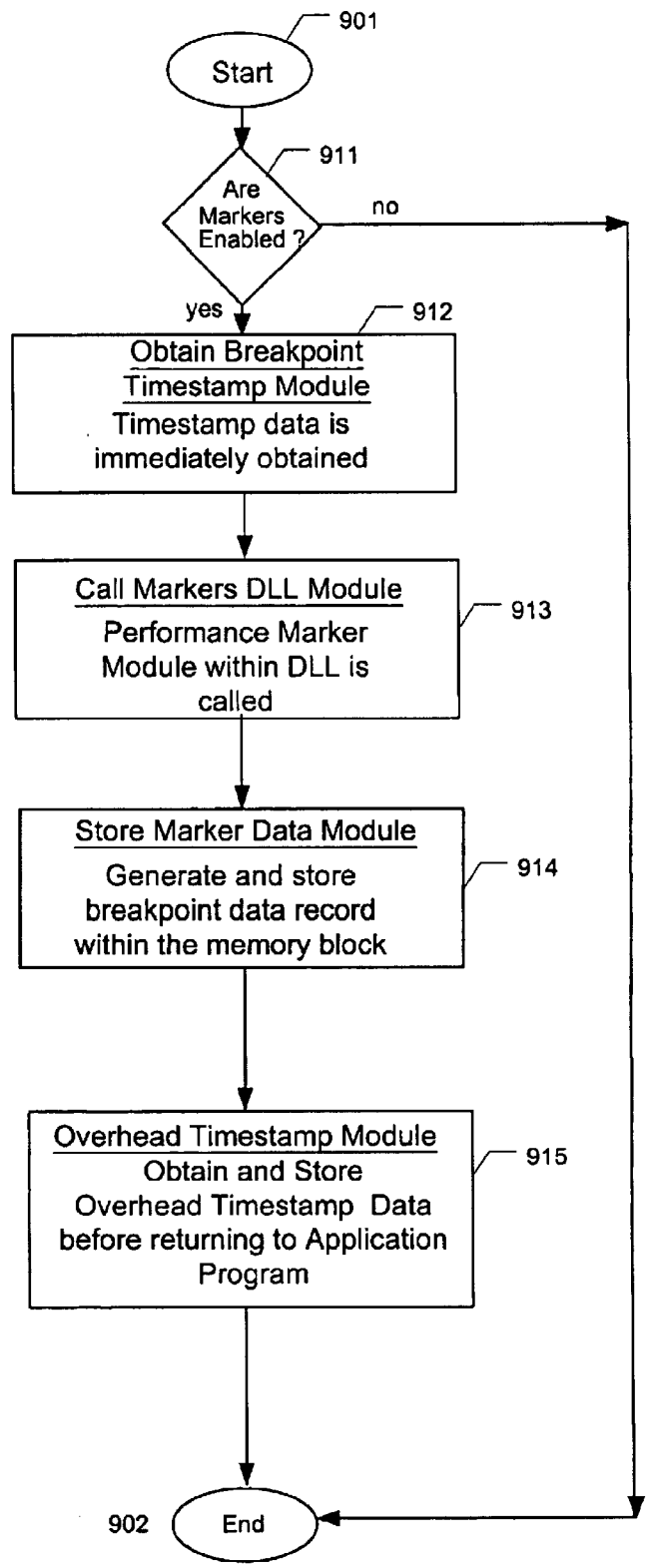
FIG. 9 is an operational flow for a markers data module within a performance markers module according to another embodiment of the present invention.

FIG. 9 is an operational flow for a markers data module within a performance markers module according to another embodiment of the present invention. Within the code marker processing, the processing starts 901 and tests module 911 immediately determines whether benchmark processing is to occur. In one embodiment, this test checks the marker flag that narrow has been previously set within the initialization process. If the code marker processing is not to occur, the processing merely branches to the end 902. As such, a benchmark code marker processing simply results in a call to a statically linked library routine which checks a flag and immediately returns back to the main processing modules. As such, the overhead associated with the execution of an application program containing performance marker is quite minimal. This approach allows application programs to contain performance markers used to test and evaluate the performance of the application program in the program itself as they would ship to end users. The testing that occurs need not be performed on a modified version of the application program which does not represent the state of the product which is actually ship to end users. This operation overhead processing does not impinge upon the performance of the application program itself, while still providing an extensible means by which the testing of the application program may be performed.

If the flag indicates that performance code marker processing is to occur, processing proceeds to an Obtain Breakpoint Timestamp module 912. This module 912, which is located within the link library, obtains the first of two timestamp data measurements. This timestamp data measurement corresponds to the Benchmark Timestamp data 513 within the benchmark data record 500. Next call marker DLL module 913 calls the DLL module to gather any additional data relating to the state of the application program at the time the code marker is reached. This module 913 passes the Benchmark Timestamp data 513 value to the Marker_DLL 422 for use in generating the benchmark data record 500.

Store Marker Data Module 914 generates the benchmark data record 510 using the Benchmark Timestamp data 913 value passed from the call marker DLL module 913. This Store Marker Data module 914 then stores the generate benchmark data record 510 within the performance marker data memory block 424. As part of this process, a benchmark data record is generated within a format desired for the particular data being collected. Once the data has been stored, an Overhead Timestamp module 915 may obtain a second timestamp measurement and stores the obtained value within the Overhead Timestamp Data field 514 of the benchmark data record 5 10. As discussed above, the timing data typically includes a time stamp associated with the beginning of the benchmark code marker processing.

Because the above collection of modules that are needed to obtain the data, format the data, and store the data within the memory block 424 takes some measurable amount of processing time, as measured in clock cycles, to perform its operations, a more accurate estimate for a benchmark for the processing that occurs between two code markers would attempt to subtract the time spent within all of these benchmark modules. As such, this record may include a second time stamp associated with time at which the processing returns back to the main application. The second time stamp may be generated and stored within the memory block by the Overhead Timestamp module 915. With all of the data now collected and stored within the memory block 424, the processing ends 902.

Figure 10:
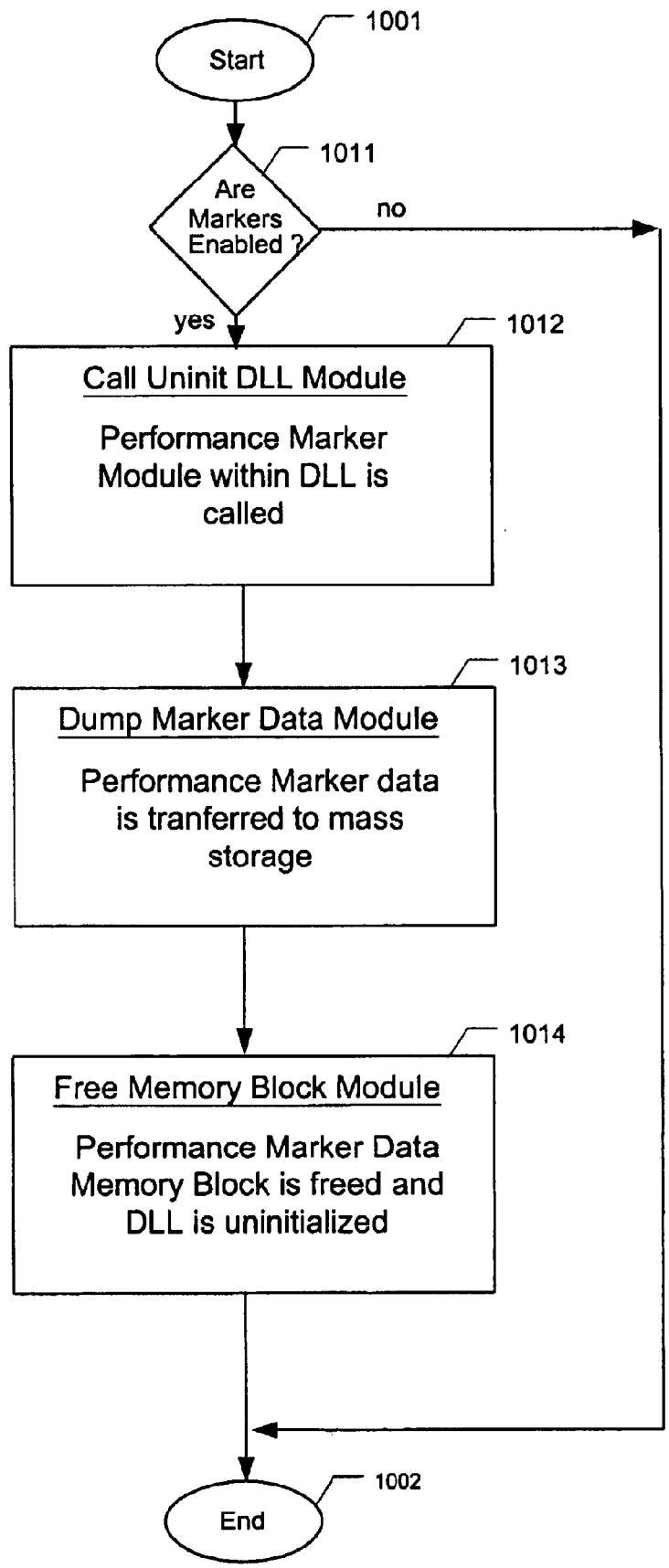
FIG. 10 is an operational flow for an uninitalization module within a performance markers module according to another embodiment of the present invention.

FIG. 10 is an operational flow for an uninitalization module within a performance markers module according to another embodiment of the present invention. Within the unInit processing, the processing starts 1001, and tests module 101 immediately determines whether benchmark processing is to occur. In one embodiment, this test module 1011 checks the marker flag that had been previously set within the initialization process. If the code marker processing is not to occur, the processing merely branches to the end 1002. As such, the unInit processing simply results in a call to the linked library routine which checks a flag and immediately returns back to main processing. As discussed above, this sequence of operations imposes a minimal amount of processing upon an application program 101 when sent to the end user without the performance marker DLLs.

If performance marker processing is to occur, this set of modules formats and stores the collected set of benchmark data records for later use. The processing proceeds from test operation 1011 to a Call uninit DLL module 1012. This module 1012, which is located within the statically link library, calls the DLL module to move the collection of benchmark data records from the DLL memory block 424 to mass storage 111. Typically, these records are stored within a file in the computer's file system for later use. This data may be stored in either a binary format, or may be converted into a human readable form. Because the uninit process occurs at the end of the testing process, occurs only once, and occurs after all time critical events are over, this data conversion processing may occur within the DLL modules without affecting the results from the testing. Alternatively, this data formatting operation may occur within the post processing modules 316 at a later date. Once the data has been stored for later use, a Free Memory Block module 814 performs any system housekeeping processing necessary to free the memory used by the DLL modules that is no longer needed.

Thus, the present invention is presently embodied as a method, apparatus, computer storage medium, or propagated signal containing a computer program for manufacture for inserting performance markers into programs to obtain and provide data regarding the run-time operation of the programs.

While the above embodiments of the present invention describe insertion of performance markers into programs to obtain and provide data regarding the run-time operation of the programs, one skilled in the art will recognize that the type of run-time data collected and returned to a user may represent any data collectable from the computing system and its operating state. As long as the performance markers are inserted within the application program at the locations in which the testing is to occur, and as long as the particular data collection processing is specified within the libraries, the present invention to would be useable in any testing environment. It is to be understood that other embodiments may be utilized and operational changes may be made without departing from the scope of the present invention.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium, or propagated signal containing a computer program for providing a method, apparatus, and article of manufacture for inserting performance markers into programs to obtain and provide data regarding the run-time operation of the programs.

What is claimed is:

1. A computing system having a mass storage device and a system timer for obtaining benchmark timing for a portion of an application program execution, the application program having permanently inserted performance markers, the computing system comprising:

a mass storage system;

an init module for determining if the timestamp data is to be collected during the operation of the application program;

a performance marker module for obtaining and storing the timestamp data for later retrieval;

an uninit module for formatting and storing the obtained timestamp data into a data file within the mass storage device that permits retrieval after the termination of the application program; and a performance benchmark data post processing module for determining the benchmark timing from two or more timestamp data entries;

wherein the performance marker module is executed at predefined points corresponding to the permanently inserted performance markers within a plurality of processing modules within the application program.

2. The system according to claim 1, wherein:

the init module is executed before any timestamp data is collected;

the performance marker module is executed each time benchmark timestamp data and overhead timestamp data is to be collected;

the uninit module is executed after all timestamp data desired has been collected to store the timestamp data within records of a Raw Data Table; and the performance benchmark data post processing module determines the benchmark timing from the records stored within the Raw Data Table.

3. The computing system according to claim 2, wherein the init module determines if timestamp data is to be collected.

4. The computing system according to claim 3, wherein init module makes the determination that timestamp data is to be collected by checking for the existence of an identification key within a system registry;

the identification key uniquely identifies the processing modules to be used to collect, format, and store the run-time internal state data to be collected.

5. The computing system according to claim 4, wherein the performance marker module collects timestamp data only if the init module has determined that the timestamp data is to be collected.

6. The computing system according to claim 5, wherein the performance marker module generates a data record within the Raw Data Table each time the performance marker module is executed.

7. The computing system according to claim 6, wherein the benchmark data record further containing an overhead timestamp data value each time the performance marker module is executed.

8. The computing system according to claim 7, wherein the performance marker module stores the benchmark data records within a data memory block within the processing modules identified by an identification key within a system registry.

9. The computing system according to claim 8, wherein the uninit module retrieves the data records from the data memory block for transfer to the Raw Data Table on the mass storage device.

10. The computing system according to claim 9, wherein the performance benchmark data post processing module determines the benchmark timing from difference between two benchmark timestamp data entries stored within the Raw Data Table to generate a second data Record within a Processed Data Table.

11. The computing system according to claim 10, wherein the data record within the Raw Data Table comprises a ResultID field, an AppID field, a MarkerID field, a Marker Cycles Field, and an Overhead Cycles field.

12. The computing system according to claim 11, wherein the second data record of the Processed Data Field comprises a ResultID field, a Reboot Iteration field, a Launch Iteration field, a Marker Iteration field, a Marker Pair ID field, and a Seconds Field.

13. The computing system according to claim 12, wherein the ResultID field of the Raw Data Table corresponds to the ResultID field in the Processed Data Table.

14. The computing system according to claim 12, wherein the Marker Pair ID field corresponds to a second Marker Pair ID field in a Marker Pair Table.

15. The computing system according to claim 14, wherein the Marker Pair Table comprises the second Marker Pair ID field, a start App ID field, a start Marker ID field, an End App ID field, an End Marker ID field, and a MarkerPair Name field.

16. A method for obtaining benchmark timing for a portion of an application program execution, the application program having permanently inserted performance markers, the method comprising:

permanently inserting one or more performance markers into the application program at predefined locations within the application program corresponding to the point at which benchmark timing data is desired;

determining if benchmark timing data is to be collected at each performance marker by checking for the existence of processing modules identified by an identification key within a system registry;

if benchmark timing data is to be collected at each performance marker:

generating a benchmark data record containing the collected benchmark timing data each time the performance markers are reached;

storing the benchmark data records within a data memory block within the processing modules identified by the identification key within the system registry;

retrieving the benchmark data records from the data memory block for transfer to first data record in a Raw Data Table device once all of the run-time internal state data has been collected; and processing the first data records stored within the Raw Data Table to generate second data records in a Processed Data Table that estimate the benchmark timing defined between two benchmark data records.

17. The method according to claim 16, wherein the benchmark timing generated and stored within the processed data table is determined from difference between two benchmark timestamp data entries stored within the raw data table.

18. The method according to claim 17, wherein the benchmark timing is determined by subtracting an estimate for the total overhead processing from the difference between two benchmark timestamp data entries stored within the raw data table;

the estimate for the total overhead processing is determined by totaling the difference between an overhead timestamp value and a benchmark timestamp value for all code markers between the two benchmark timestamp entries used to determine the benchmark timing;

the benchmark timestamp value is obtained from a system timer immediately after a code marker is reached; and the overhead timestamp value is obtained from the system timer immediately before the processing returns to the application program from performance marker processing.

19. The method according to claim 18, wherein the first data record within the Raw Data Table comprises a ResultID field, an AppID field, a MarkerID field, a Marker Cycles Field, and an Overhead Cycles field.

20. The method according to claim 19, wherein the second data record of the Processed Data Field comprises a ResultID field, a Reboot Iteration field, a Launch Iteration field, a Marker Iteration field, a Marker Pair ID field, and a Seconds Field.

21. The method according to claim 20, wherein the ResultID field of the Raw Data Table corresponds to the ResultID field in the Processed Data Table.

22. The method according to claim 21, wherein the Marker Pair ID field corresponds to a second Marker Pair ID field in a Marker Pair Table.

23. The method according to claim 22, wherein the Marker Pair Table comprises the second Marker Pair ID field, a start App ID field, a start Marker ID field, an End App ID field, an End Marker ID field, and a MarkerPair Name field.

24. A computer data product readable by a computing system and encoding a computer program of instructions for executing a computer process for obtaining run-time internal state data within an application program, the application program having permanently inserted performance markers, said computer process comprising:

permanently inserting one or more performance markers into the application program at predefined locations within the application program corresponding to the point at which benchmark timing data is desired;

determining if benchmark timing data is to be collected at each performance marker by checking for a processing modules identified by an identification key within a system registry;

if benchmark timing data is to be collected at each performance marker:

generating a benchmark data record containing the collected benchmark timing data each time the code markers are reached;

storing the benchmark data records within a data memory block within the processing modules identified by the identification key within the system registry;

retrieving the benchmark data records from the data memory block for transfer to first data record in a Raw Data Table device once all of the run-time internal state data has been collected; and processing the first data records stored within the Raw Data Table to generate second data records in a Processed Data Table that estimate the benchmark timing defined between two benchmark data records;

wherein the benchmark timing generated and stored within the processed data table is determined from difference between two data entries stored within the raw data table.

25. The computer data product according to claim 24, wherein the benchmark timing is determined by subtracting an estimate for the total overhead processing from the difference between two benchmark timestamp data entries stored within the raw data table;

the estimate for the total overhead processing is determined by totaling the difference between an overhead timestamp value and a benchmark timestamp value for all code markers between the two benchmark timestamp entries used to determine the benchmark timing;

the benchmark timestamp value is obtained from a system timer immediately after a code marker is reached; and the overhead timestamp value is obtained from the system timer immediately before the processing returns to the application program from performance marker processing.

26. The computer data product according to claim 25, wherein the first data record within the Raw Data Table comprises a ResultID field, an AppID field, a MarkerID field, a Marker Cycles Field, and an Overhead Cycles field.

27. The computer data product system according to claim 26, wherein the second data record of the Processed Data Field comprises a ResultID field, a Reboot Iteration field, a Launch Iteration field, a Marker Iteration field, a Marker Pair ID field, and a Seconds Field.

28. The computer data product according to claim 27, wherein the ResultID field of the Raw Data Table corresponds to the ResultID field in the Processed Data Table.

29. The computer data product according to claim 28, wherein the Marker Pair ID field corresponds to a second Marker Pair ID field in a Marker Pair Table.

30. The computer data product according to claim 29, wherein the Marker Pair Table comprises the second Marker Pair ID field, a start App ID field, a start Marker ID field, an End App ID field, an End Marker ID field, and a MarkerPair Name field.

31. The computer data product according to claim 24, wherein the computer data product comprises a computer readable storage medium readable by a computer upon which encoded instructions used to implement the computer process are stored.

* * * * *